(12) United States Patent
Bernardini et al.

(10) Patent No.: US 7,084,386 B2
(45) Date of Patent: Aug. 1, 2006

(54) SYSTEM AND METHOD FOR LIGHT SOURCE CALIBRATION

(75) Inventors: Fausto Bernardini, New York, NY (US); Frank P. Giordano, Scarsdale, NY (US); Jose Gomes, Douglaston, NY (US); Holly Rushmeier, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/429,108

(22) Filed: May 2, 2003

(65) Prior Publication Data

US 2004/0217260 A1    Nov. 4, 2004

(51) Int. Cl.
*G01J 1/00*    (2006.01)

(52) U.S. Cl. ............... 250/216; 250/208.1; 356/243.1; 702/104 G

(58) Field of Classification Search .............. 250/208.1, 250/228; 356/121, 243.1; 702/93–95, 104, 702/116, 150–153
See application file for complete search history.

(56) References Cited

U.S. PATENT DOCUMENTS

| | | | |
|---|---|---|---|
| 5,253,036 A | 10/1993 | Ashdown | 356/121 |
| 5,611,147 A | 3/1997 | Raab | 33/503 |
| 5,974,168 A | 10/1999 | Rushmeier et al. | 382/141 |
| 6,128,585 A * | 10/2000 | Greer | 702/104 |
| 6,219,063 B1 | 4/2001 | Bouguet et al. | 345/426 |
| 6,455,835 B1 | 9/2002 | Bernardini et al. | 250/208.1 |
| 2003/0038933 A1 * | 2/2003 | Shirley et al. | 356/243.1 |

FOREIGN PATENT DOCUMENTS

EP    1091186 A2 *    4/2001

OTHER PUBLICATIONS

Bernardini, Fausto et al., "The 3D Model Acquisition Pipeline", Computer Graphic Forum, vol. 21 (2002) No. 2, pp. 149-172.

Smith, Melvyn et.al., "Advances in Machine Vision and the Visual Inspection of Engineered and Textured Surfaces", Business Briefing: Global Photonic Applications and Technology, World Markets Research Center, (2001), pp. 81-84.

McGunnigle, G., et al., "Recovery of Fingerprints Using Photometric Stereo", IMVIP2001, Irish Machine Vision and Image Processing Conference, Sep. 2001, pp. 192-199.

(Continued)

*Primary Examiner*—Stephone B. Allen
(74) *Attorney, Agent, or Firm*—Satheesh K. Karra; Harrington & Smith, LLP

(57) ABSTRACT

A light source calibration target has a surface in view of a camera of an image capture system, The target includes a substrate having a substantially Lambertian surface, a visually distinct polygonal shape having corners formed on said surface so as to be visually distinct from the surface, and a plurality of objects each having an upstanding tip mounted on the surface, A method of using the calibration target operates, for each of the light sources to be calibrated, to capture an image of the target; process the captured image to derive light source calibration data and to store the calibration data.

14 Claims, 7 Drawing Sheets

OTHER PUBLICATIONS

Lensch. Hendrik, et al., "Image-Based Reconstruction of Spatially Varying Materials", Rendering Techniques'01, London, UK, Jun. 2001, 13 pages.

Rushmeier, H. et al., "Computing consistent normals and colors from Photometric Data", Proc. Of the Second Intl. Conf. On 3-D Digital Imaging and Modeling, Ottawa, Canada, Oct. 1999, 10 pages.

Triggs, Bill, "Camera Pose and Calibration from 4 or 5 known 3D Points", ICCV 99, Kerkyra, Greece, Sep. 1999, pp. 278-284.

Garbow, Burton S. et al, "Documentation for MINPACK subroutine LMDIF1 Double Precision Version", Argonne National Laboratory, Mar. 1980, pp. 1-7.

R. Woodham, "Photometric method for determining surface orientation from multiple images", Optical Engineering, 19(1): 139-144, 1980.

Roger Y. Tsai, An efficient and accurate camera calibration technique for 3D machine vision, in Computer Vision and Pattern Recognition, pp. 364-374, Jun. 1986.

* cited by examiner

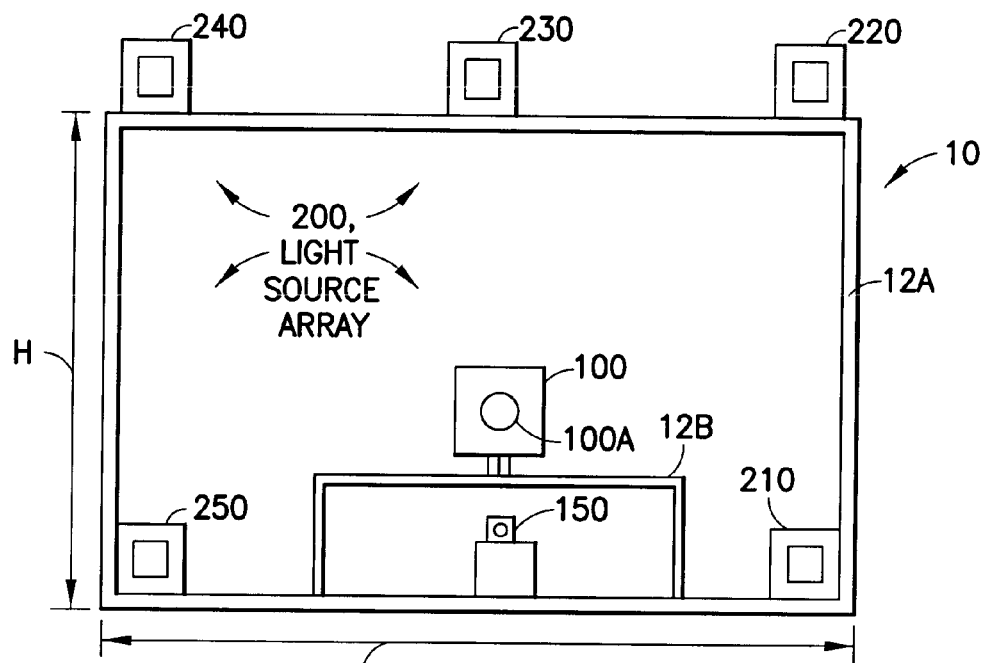
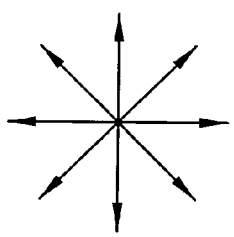
FIG.2A
IDEAL LIGHT SOURCE
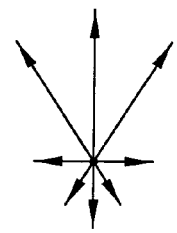
FIG.2B
REAL LIGHT SOURCE
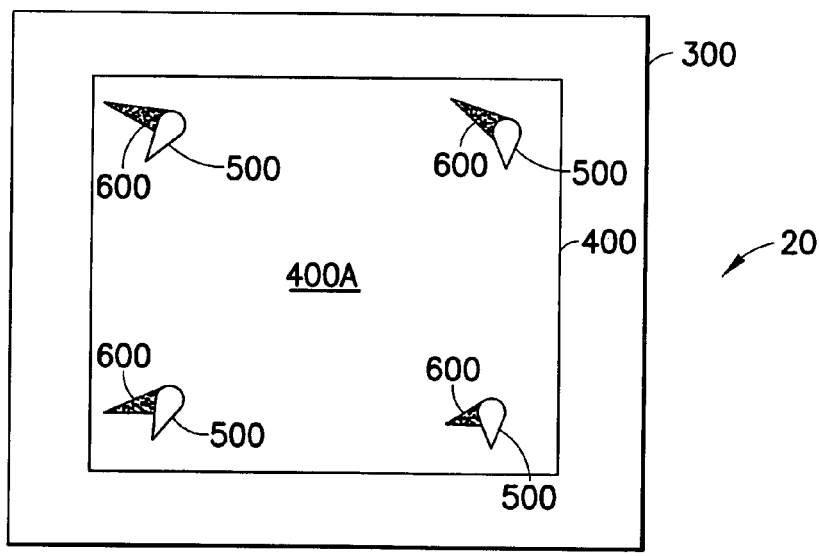
FIG.3

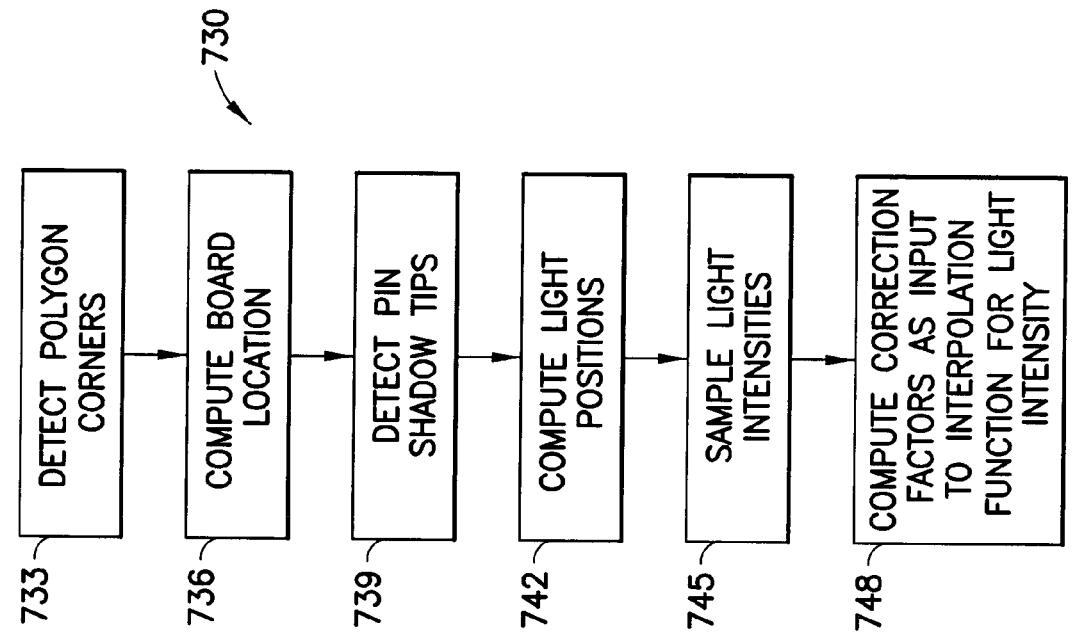

SYSTEM AND METHOD FOR LIGHT SOURCE CALIBRATION

TECHNICAL FIELD

These teachings relate generally to image capture systems and, more specifically, to light sources and techniques for light source calibration for image capture systems.

BACKGROUND

Advanced three-dimensional (3D) scanning systems intended for 3D graphics applications, and in particular for realistic rendering applications, capture both the shape (geometric properties) and photometric properties of objects. Machine vision systems for inspecting surface finish quality also capture both the geometric and photometric properties of objects.

As employed herein, capturing the "shape" of an object means to model mathematically the 3D space occupied by the object, while capturing the "photometric properties" of an object means to model mathematically how the object interacts with light, such as how the object reflects and refracts light.

There exist in the literature several predictive models for light reflection, with different levels of complexity depending on the shape and on the type of considered object material. The data required to "fit" such models is composed of images acquired under different {yet known} illumination conditions. In practice, the shape and photometric data may be obtained by using several light sources of relatively small size, positioned at some distance from the object and preferably somewhat evenly distributed around it. A representative example of one such object illumination and image capture system 10 is shown in FIG. 1. Reference may also be had to FIG. 9 of commonly assigned U.S. Pat. No. 6,455,835 B1, "System, Method, and Program Product for Acquiring Accurate Object Silhouettes for Shape Recovery", By Fausto Bernardini, Henning Biermann, Holly E. Rushmeier, Silvio Savarese and Gabriel Taubin (incorporated by reference herein), for showing an array of M (e.g., nine) light sources mounted on a frame with a color camera.

In FIG. 1 the object illumination and image capture system 10, also referred to herein as a "scanning system", includes an outer frame 12A and an inner frame 12B. A camera, such as a color camera 100, is mounted on the inner frame 12B, and a plurality, e.g., five, halogen light sources 210, 220, 223, 240 and 250 are mounted on the outer frame. A laser scanning device 150 for capturing object shape information may be provided as well. Representative dimensions are a height (H) of 50 cm, and a width (W) of 100 cm.

The goniometric (i.e., directional) distribution of the lights 210–250, and their locations with respect to the camera 100, are determined a priori. Nominal goniometric data is typically provided by the light source manufacturer, but vary from source to source and over time. Exemplary light distribution is illustrated in FIGS. 2A and 2B for ideal and real light sources, respectively. The location of the light sources is measured in the context of a particular data acquisition system.

An example of a scanning method that uses small light bulbs with calibrated position and known directional distribution for photometric stereo can be found in R. Woodham, "Photometric method for determining surface orientation from multiple images", *Optical Engineering*, 19(1):139–144, 1980. One application of photometric stereo is in the inspection of surfaces to detect flaws or cracks (see, for example, M. Smith and L. Smith, "Advances in machine vision and the visual inspection of engineered and textured surfaces", *Business Briefing: Global Photonic Applications and Technology, World Markets Research Center*, pages 81–84, 2001). Another application of photometric stereo is the recovery of finger prints: G. McGunnigle and M. J. Chantler, "Recovery of fingerprints using photometric stereo", in *IMVIP*2001, *Irish Machine Vision and Image Processing Conference*, pages 192–199, September 2001. Capturing images of objects illuminated by small light bulbs with calibrated position with a geometrically calibrated camera is also used to compute the surface properties (color and specularity) of objects for use in computer graphics rendering systems. A summary of such methods can be found in F. Bernardini and H. Rushmeier, "The 3d model acquisition pipeline", *Computer Graphics Forum*, 21(2), 2002. Recent publications that describe this type of application in more detail are: Hendrik P. A. Lensch, Jan Kautz, Michael Goesele, Wolfgang Heidrich and Hans-Peter Seidel, "Image-based reconstruction of spatially varying materials", in *Rendering Techniques* '01, London, UK, June 2001, and H. Rushmeier and F. Bernardini, "Computing consistent surface normals and colors from photometric data", in *Proc. of the Second Intl. Conf. on 3-D Digital Imaging and Modeling*, Ottawa, Canada, October 1999. The computer graphics rendering of captured objects is used in many applications, such as feature films, games, electronic retail and recording images of cultural heritage.

Various techniques have been employed in the past to address the problem of measuring either the position of a light source or its directional distribution. One method for measuring the position of small light sources is to use a separate digitizing system, such as a robotic arm or other portable coordinate measurement system. An example of such an arm is described in U.S. Pat. No. 5,611,147, "Three Dimensional Coordinate Measuring Apparatus", Raab. Another method for measuring light source position is to observe two or more shadows of objects, with known dimensions, on a plane, where for each the coordinates are known in terms of the camera coordinate system. Such a method is described in U.S. Pat. No. 6,219,063, "3D Rendering", Bouguet et al. Knowing the position of the base of two objects, and the end of their shadow (or the same object in two locations), the light source position can be computed by finding the intersection of the rays joining each end-of-shadow and object tip pair.

An ideal light source emits light isotropically, as shown in FIG. 2A. However, all practical (real) light sources emit light with a directional distribution, as shown in FIG. 2B. A number of complex methods have been devised to measure the directional distribution from a light source, and a summary of such methods can be found in U.S. Pat. No. 5,253,036 "Near-Field Photometric Method and Apparatus", Ashdown. These methods generally involve taking numerous individual measurements with a light meter in the sphere of directions surrounding the light source.

A robotic arm (as in U.S. Pat. No. 5,611,147), or a portable coordinate measurement system, can very accurately measure light source position. However, a robotic arm can be very costly, particularly if a large workspace (the distance between the light sources used) is considered. A robotic arm also requires substantial human intervention, since the arm tip has to be manually placed at the center of each light source to make the measurements. Finally, after finding the light source positions, a robotic arm cannot be used to make measurements of the light source directional distribution. A separate measurement technique is required to make the measurement of directional distribution.

The shadow casting method described in U.S. Pat. No. 6,219,063 is limited in the space in which light positions can be calibrated. The method requires that the location of the plane on which the shadows are cast is known a priori. However, the location of the plane can only be known in camera coordinates if that plane itself is used for the original camera calibration. This limits the orientations of shadows that can be observed. Furthermore, a planar calibration method requires that the plane used cannot be perpendicular to the line-of-sight of the camera. Also, the method described in U.S. Pat. No. 6,219,063 results in only approximate light locations, as there is no method to specify the precise location of the tip of the shadow casting object. The tip of the shadow-casting object is specified only to the accuracy of the width of the shadow-casting object. Since there is no unique feature of the object base, a point on the base must be specified manually by the user. The result is also prone to error since the shadow tip is not well defined, and can only be reliably located by the user manually locating a pixel that coincides with the tip of the shadow-casting object. This technique also requires two or more images for each light source, and no method for computing the light source distribution in the scanning area is included.

Determining the light source directional distribution with a series of light meter measurements as described in U.S. Pat. No. 5,253,036 is time consuming, and furthermore requires the use of an additional device beyond the camera and light sources needed in the photometric or 3D scanning system.

As can be appreciated, the foregoing prior art techniques for light source calibration are not optimum, as they involve increased cost and complexity, and/or manual user intervention which can give rise to user-introduced errors.

SUMMARY OF THE PREFERRED EMBODIMENTS

The foregoing and other problems are overcome, and other advantages are realized, in accordance with the presently preferred embodiments of these teachings.

Disclosed herein is a system and method for calibrating light sources used in machine vision and computer graphics capture systems. More specifically, this invention pertains to a system and method for calibrating light sources used in image capture systems where objects are illuminated by only one point source of light at a time, and the images of the objects are acquired with a geometrically calibrated camera. The method employs the use of a calibration target that casts a shadow onto itself. Images of the calibration target are acquired under the same illumination conditions as those used with actual objects. In that the geometries of the camera and of the target are known, the acquired images are used to geometrically characterize the cast shadows of the target, and thus deduce the locations of the light sources. In the preferred embodiment the target surface also has a uniform, diffuse, light dispersive Lambertian coating. By observing the distribution of light reflected from the target surface from each light source the directional distribution of the light sources can be measured.

This invention provides for a system and a method for the calibration of the position and directional distribution of light sources using only images of a predetermined target object. The invention assumes that the camera has previously been geometrically calibrated. The technique for determining light source position builds on the simple observation that a point source of light, a point on an object and the corresponding point in its cast shadow all lie on the same line. The position of a light source is found by determining the intersection of a plurality of such lines. Given the position of the light source, a description of its directional distribution can be obtained by comparing observations of light emitted from the source to the light that would be emitted from an ideal source. In the presently preferred embodiment of this invention the calibration procedure is completely automatic, requiring the user only to physically place the target object in front of the camera.

The light source location calibration procedure of this invention uses shadows cast by target objects. However, unlike the prior art approaches that also use object shadows, there is no restriction on the location of the plane on which the shadows are cast, and in particular the plane may be perpendicular to the camera line of sight. A unique target with an inscribed pattern and with geometric objects affixed to it is used, and the location of the objects and the shadows they cast are found precisely without requiring user intervention, and thus without introducing the possibility for user error.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 is a simplified front view of a prior art scanning system that uses an array of small light sources and a camera to capture geometric and photometric data;

FIGS. 2A and 2B illustrate light source directional distributions, where the ideal light source of FIG. 2A emits light uniformly in all directions, while the light emitted from an actual light source (FIG. 2B) varies with emission direction;

FIG. 3 is a front view of a white, Lambertian (diffuse) calibration target used for light source calibration, the target including a black outline rectangle and a set of cones mounted on the diffuse surface of the target;

FIG. 10 is a logic flow diagram that illustrates a light source calibration method in accordance with this invention;

FIG. 11 is a logic flow diagram that illustrates in further detail the process image step in FIG. 10.

DETAILED DESCRIPTION OF THE PREFERRED EMBODIMENTS

Disclosed herein is light source calibration technique for calibrating an image capture system working volume, such as the image capture system 10 shown in FIG. 1, that is arbitrarily oriented with respect to the camera 100 of the photometric system. The light source calibration technique uses the camera 100 to acquire a set of digital images of a specially designed calibration target, with one image taken with each one of the light sources 210–250 to be calibrated (i.e., one light source is turned on at a time, and an image is captured for each illumination source in turn). The only required manual intervention is to physically place the calibration target in front of the camera 100. The photometric or scanning system 10 requires a geometrically calibrated camera 100. By "geometrically calibrated" what is implied is that, in terms of a 3D coordinate system in the world, the extrinsic camera properties of camera location, view direction, and "up" orientation are known. These extrinsic properties can be expressed as a translation T and a rotation R, expressed in the world coordinate system, that enable any object in the world system to be transformed to the camera coordinate system, where the "eye" or entrance pupil 100A of the camera 100 is located at the origin (0,0,0). By "geometrically calibrated" what is also implied is that the focal length of the camera 100 has been measured. The geometric calibration of the camera 100 can be performed by any of a variety of known techniques. In the preferred embodiment of the calibration system a non-coplanar camera calibration method described by Roger Y. Tsai, "An efficient and accurate camera calibration technique for 3D machine vision, in *Computer Vision and Pattern Recognition*, pages 364–374, June 1986, is used, although the teachings of this invention are not limited to only this one particular camera calibration technique.

Figure 12:
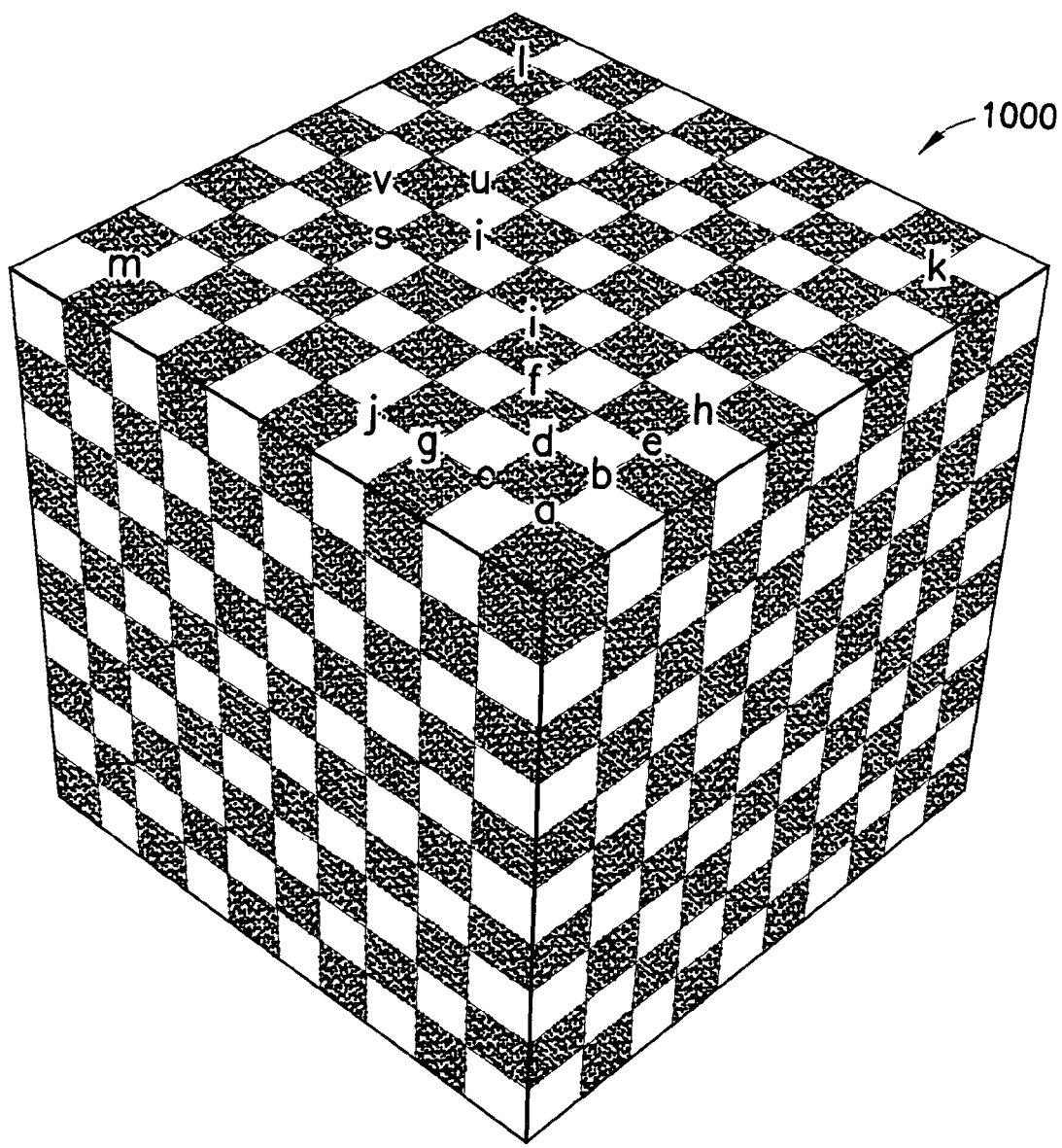
FIG. 12 is a depiction of one suitable calibration target or object for calibrating the digital camera.

FIG. 12 shows an example of a calibration target 1000 for the camera 100 alignment, in this case a cube with a checkerboard pattern for camera 100 and laser scanner calibration 900. The calibration procedure of Tsai is used with the cube having a precise checkerboard pattern on each of three adjacent sides to establish the three dimensional positions of the two dimensional features detected in the image of the cube. It is preferred for many applications of interest that sub-millimeter accuracy is achieved so that when scans are registered and combined with the colors, the fine-detailed normals are not blurred. Such accuracy requires a calibration target 1000 with the corners placed with an accuracy of 0.1 mm over a distance of about 20 cm. A variety of patterning techniques, including printing on various media and the precision milling polymeric or metallic materials can be employed. To maintain the required accuracy with a surface that is not specular, the surface may be created by mechanically sandblasting 6061 Al plates to create a random surface texture, combined with a chemical etch to smooth microscopic specular regions. The checkerboard pattern can be exposed in a dry film photo-resist with a step and repeat camera to maintain tight cumulative geometric tolerance across the large substrate. Exposed regions in the photo-resist are subsequently black anodized.

The calibration begins with the acquisition of the cube in a standard position, as shown in FIG. 12. The corners of the three checkerboards are then detected for providing camera 100 calibration data. The preferred camera 100 calibration method employs several fully automatic phases during which patterns of increasing complexity are detected. But, depending on the visual feedback, the user decides at which phase to begin and provides input clicks accordingly. The full process is applied independently to each checkerboard. Each phase begins with a known pattern defined by a certain number of points. In phase 1, the user clicks a triangle (a, b, c) representing a normal basis of the checkerboard. Then, from the extrapolated parallelogram (a, b, d, c), and using an automatic algorithm, each of the four corners is automatically adjusted so that the quadrangle matches "perfectly" the corresponding image edges. This is done by maximizing the integral of the magnitude of the image intensity gradient along the edges of the quadrangle pattern. The integral can be maximized by using a gradient ascent algorithm in multiple image scales to avoid irrelevant local minima. The initial parallelogram is allowed to deform as a general quadrangle because the camera 100 projection does not preserve parallelism. Each additional phase starts either using the known corners resulting from the previous phase or, if the user selects, by the same corners but specified manually. During the second phase the known quadrangle is extended by linear extrapolation to form the quadrangle (a, e, f, g). Using the same optimization algorithm, these four corners are then fitted automatically to the image data. The corner h is then initialized by quadratic extrapolation using a, b and e, accounting to some extent for projective depth distortion. The corners i and j are initialized similarly and the quadrangle (a, h, i, j) is automatically fitted. This process is repeated until all the corners (a, b, e, h, . . . , k), (a, d, f, i, . . . , l) and (a, c, g, j, . . . , m) are found. During the third phase, using linear, and whenever possible quadratic extrapolations, followed by automatic fitting to image data, eventually all the corners of the boundary of the checkerboard are detected. It is possible to do so by only considering a quadrangle with edges at least as large as half of the full checkerboard side. Avoiding shorter edges has been found to increase robustness. During the fourth phase, and starting from the known boundary corners, all the inside corners are initialized by simply intersecting "horizontal" and "vertical" lines. Due to camera 100 lens radial distortion, the "lines" are actually slightly curved, and deviations from the ideal line on the order of three pixels can be observed. This is accounted for during the fifth phase by fitting individual cross-hair patterns for each corner. The cross-hair pattern (s, t, u, v) is initialized and automatically fitted. The only allowed degrees of freedom during the optimization are the translation and the angle between su and tv. Furthermore, for each cross-hair pattern, this algorithm is repeated a number of times, starting from randomly selected nearby initial guesses. The corresponding corner is only considered as successfully detected if all of these tries yield the same result, up to some fraction e.g., one tenth, of a pixel. This is one suitable technique to enforce the significance of the detected corner. Finally, the detected corners are displayed, superimposed with the checkerboard image. The user then accepts or rejects the achieved detection, thereby completing the camera calibration procedure.

Referring to FIG. 3, an important aspect of this invention is the light source calibration target 20. The light source calibration target 20 includes a planar surface 300 that is preferably white and diffusely reflecting (Lambertian or substantially Lambertian) on which shadows can be cast. To produce the white diffuse target surface a conventional matte finish white paint can be used to coat a suitable smooth substrate material, or a specialized material such as LabSphere Spectralon™ may be used to coat the substrate material. The target 20 includes a set of well defined point features, such as the corners of a polygon 400 drawn in a visually contrasting color, e.g., black, on the surface 300.

The target 20 also includes a plurality of 3D geometric objects affixed to the surface 300. In the case of FIG. 3 the plurality of objects are embodied as four cones 500 with bases mounted to the surface 300 and with sharp tips located above the surface 300. A set of exemplary shadows 600 cast by the cones 500 are shown for an assumed light source located above and to the right of the surface 300.

It is possible to compute the position of the surface 300 with respect to the camera 100 by marking a number of points on the surface 300. In general, a set of more than three points on a plane with known relative locations can be used to determine the location of the plane with respect to a geometrically calibrated camera, knowing only the coordinates of the point projections in the camera image. Reference in this regard may be had to B. Triggs, "Camera pose and calibration from 4 or 5 known 3D points", in ICCV 99, pp. 278–284, Kerkyra, Greece, September 1999.

Consider a calibrated camera 100, three known points and the image locations these points. Knowing the image locations the point locations are known to be located along the rays starting at the camera origin and passing through the image plane. Knowing the relative distance between the points completely specifies where along these rays the 3D points lie in terms of the calibrated camera coordinate system. Given the location of the points, the location of the plane is readily calculated in the camera coordinate system. The location of any objects fixed to the plane in a known fashion is then also known.

From an image processing standpoint, the pixel coordinates of known points on the target surface 300 are better defined as the intersections of lines seen in the image. Lines themselves are better defined as interfaces between bright and dark areas. One technique of marking four points on the plane reconciling these requirements is to draw in a visually contrasting manner a square or a rectangle as the polygon 400. The corners of the polygon 400 thereby form the set of reference points.

Figure 4:
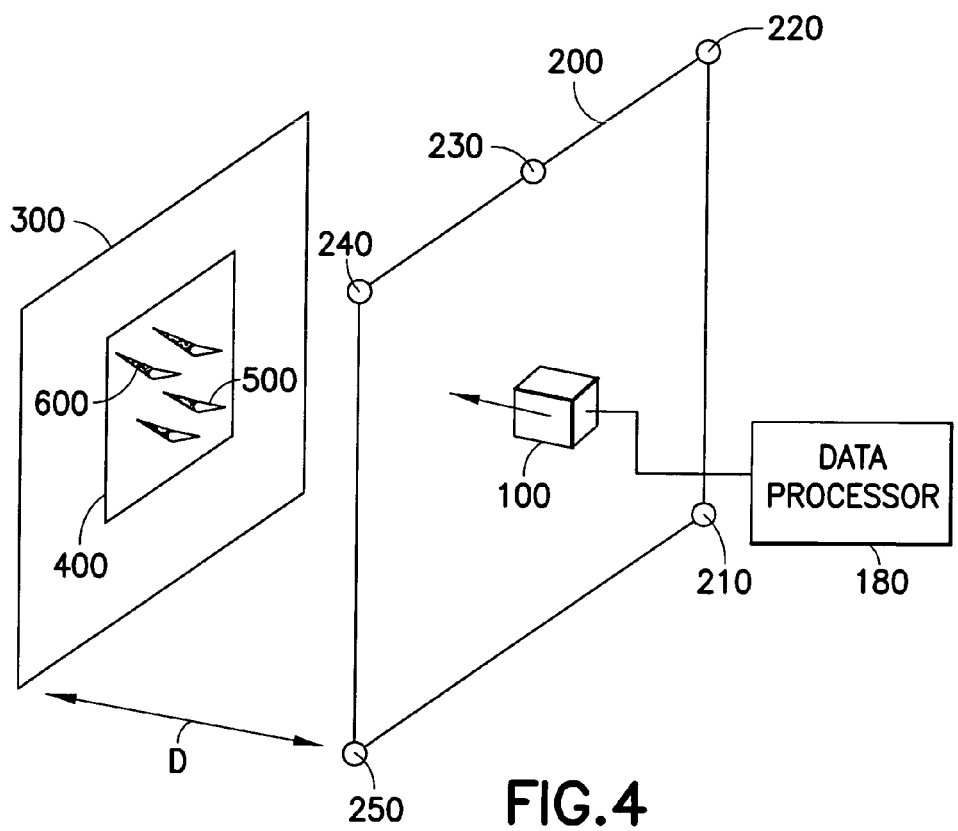
FIG. 4 shows the calibration target placed in front of a calibrated camera surrounded by an array of small light sources.
Figure 5:
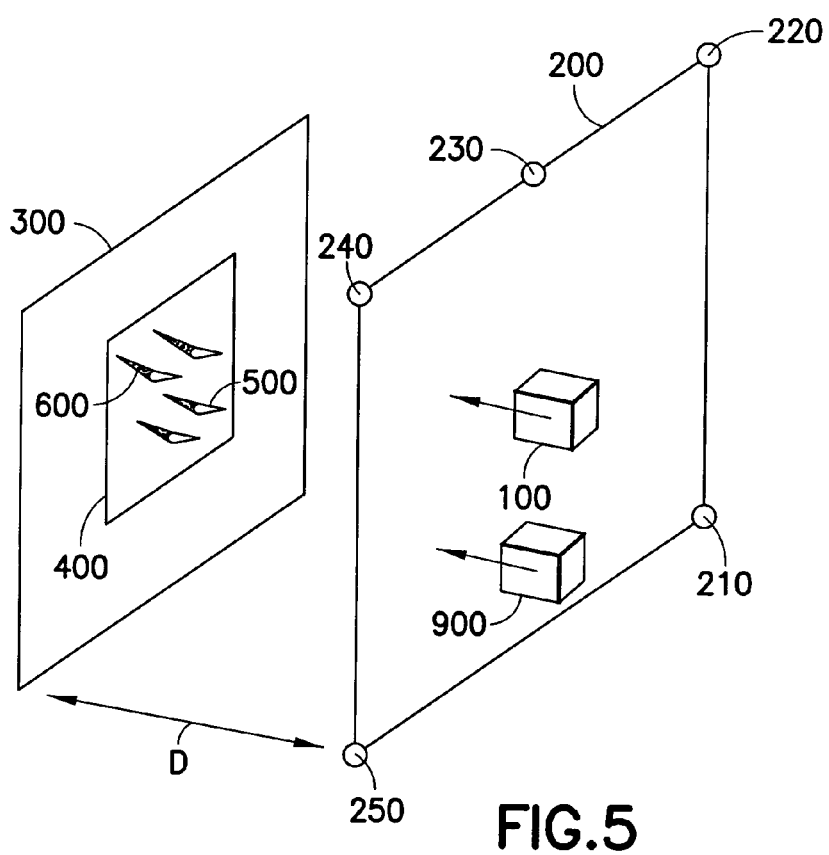
FIG. 5 shows the calibration target placed in front of the calibrated camera surrounded by an array of small light sources, and further shows the position of the camera calibrated with respect to a geometric scanning device.

Additionally, the 3D features are placed between this polygon 400 and the light sources 210–250 in order to cast shadows. These 3D features are preferably the cones 500 mounted on the surface 300 and facing the camera 100, as shown in FIGS. 3, 4 and 5. FIG. 4 shows the calibration target surface 300 placed in front of the calibrated camera 100, surrounded by the array 200 of small light sources 210–250, while FIG. 5 also shows an alternative embodiment where he position of the camera is calibrated with respect to a geometric scanning device 900, such as the laser scanner 150 shown in FIG. 1.

Figure 6:
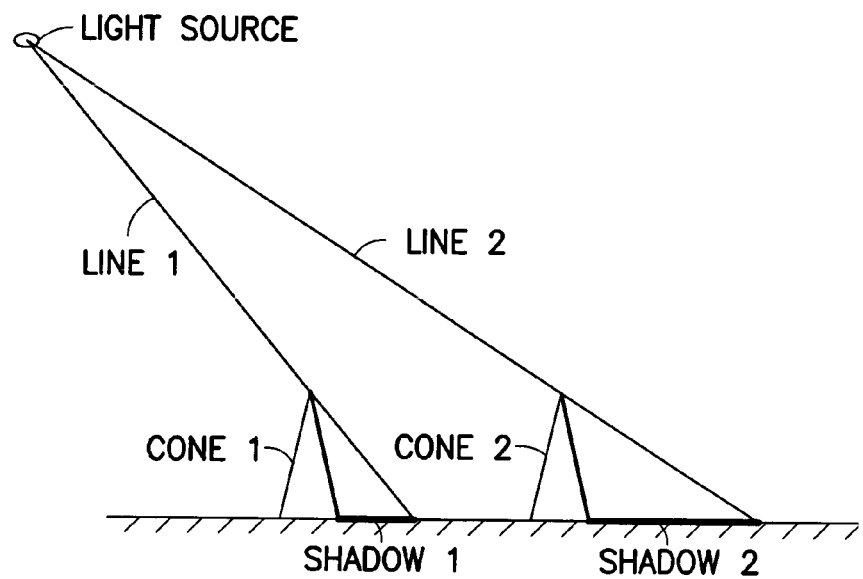
FIG. 6 illustrates the geometry of the intersection of lines through points and the shadows they cast, for determining light source position.

The positions of the tips of the cones 500 with respect to the camera 100 are known, as the geometry of the target 20 is known, including the corners of the polygon 400. Each cone 500 casts a conic shadow 600 on the white planar surface 300. The tip of the shadow 600 can be located accurately in the camera image since it is defined as the intersection of two lines which are themselves defined as the interface between dark and bright areas. Knowing the location of the plane and the pixel coordinates of the tip of the shadow 600 is sufficient to compute the 3D location of the tip of the shadow 600. Then, since the 3D locations of the tips of the cones 500, and of the shadows 600, are both known, one can determine that the energized light source 210-250 is located on the line formed by these two points. Using at least two such cones 500 mounted within the white square 400, one is thus able to determine the location of the light source 210–250 as the intersection of these lines. The underlying geometry of the intersection of lines through points and the shadows they cast, for determining the light source position, is illustrated in FIG. 6. In FIG. 6 the line1 connects the tip of cone1 and the tip of its shadow (shadow1). Line2 connects the tip of cone2 and tip of its shadow (shadow2). The intersection of lines 1 and 2 can be seen to be coincident with the position of the light source.

The intersection of the lines for the two or more cast shadows can be computed by a non-linear least square method. One suitable non-linear least squares method is known as the Levenberg-Marquardt method, (see, for example, Burton S. Garbow, Kenneth E. Hillstrom and Jorge J. More, "Documentation for MINPACK subroutine LMDIF1 Double Precision Version", Argonne National Laboratory, March 1980).

FIG. 7 illustrates the detection of the target polygon 400 corner points and the shadow 600 tips for a set of images. For each image the preferred embodiment applies a common image edge detection operator to the image. Lines are fit through sets of pixels that form approximately straight lines in the image. The intersections of the outmost sets of lines are identified as the corners of the polygon 400, and allow the location and orientation of the target surface 300 to be computed in the camera 100 coordinate system. Knowing the orientation of the surface 300, the locations of the cones 500 in the image are known and can be blocked out. The remaining short intersecting lines by each cone 500 location are identified as the edges of the cone shadow 600. The intersection of the shadow edges are identified then as the tip of the cone shadow 600. For the illustrated example, FIG. 7A shows the captured image, FIG. 7B shows the result of applying edge detection to find the outline and corners of the polygon 400 and the cone 600 tips, FIG. 7C shows the result of fitting lines to identify points on corners of the polygon 400 used to compute the location of the target 20, and FIG. 7D shows the result of fitting lines to identify the tips of the shadows 600. It should be noted that the width of lines and point locations have been exaggerated for visual clarity in FIGS. 7C and 7D.

Figure 8:
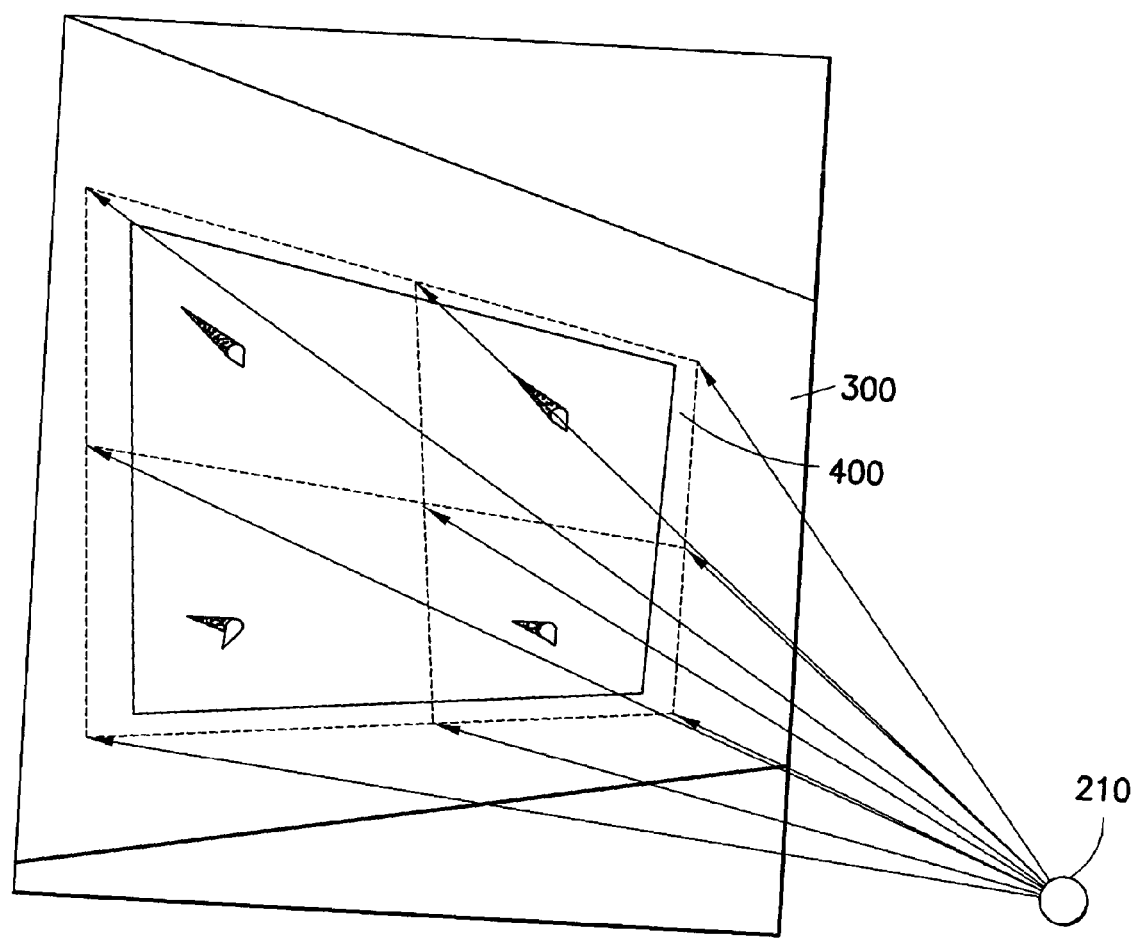
FIG. 8 illustrates how the reflected light intensity is observed at points distributed across the light calibration target, where the reflected intensity is compared to the intensity that would be reflected from an ideal light source.

The diffuse nature of the target surface 300 facilitates the estimate of the variation of the light source distribution from the ideal isotropic distribution. As shown in FIG. 8, the light magnitude of the light for different directions from a light source (e.g., 210) is sampled by observing the light reflected from the target surface 300 at points distributed across the light source calibration target 20. The sample of light reflected at the selected points may be taken as the pixel value at that point, or to reduce the effect of noise in the image, an average of values around the location may be used. For an ideal isotropic light source, the reflected light is given by the light source intensity times the cosine of the angle between a ray from the point to the light source and the surface normal, divided by the distance to the source squared. By computing how the observed reflected light varies from this ideal reflection, a ratio is formed characterizing the light in each direction, as shown in a 2D example in FIG. 9. For an application when all objects are to be scanned on the plane (the case shown in FIG. 9A), the correction for non-ideal light source distribution is computed by a simple interpolation. For an application to 3D objects, the point observed by the camera is identified in 3D, and the direction from the light source to the point is computed, as shown in FIG. 9B. The correction for the non-ideal distribution then is found by interpolating the corrections for the neighboring directions.

Figure 9A:
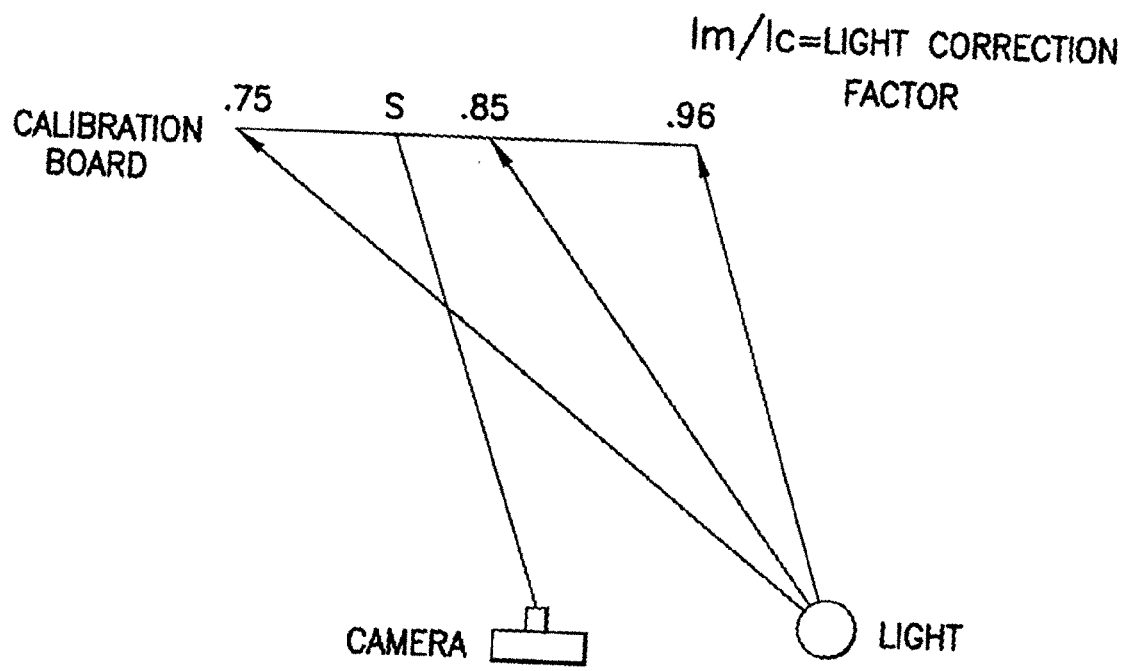
FIGS. 9A and 9B, collectively referred to as FIG. 9, illustrate that sampling points across the target surface is equivalent to sampling directions from the light source.
Figure 9B:
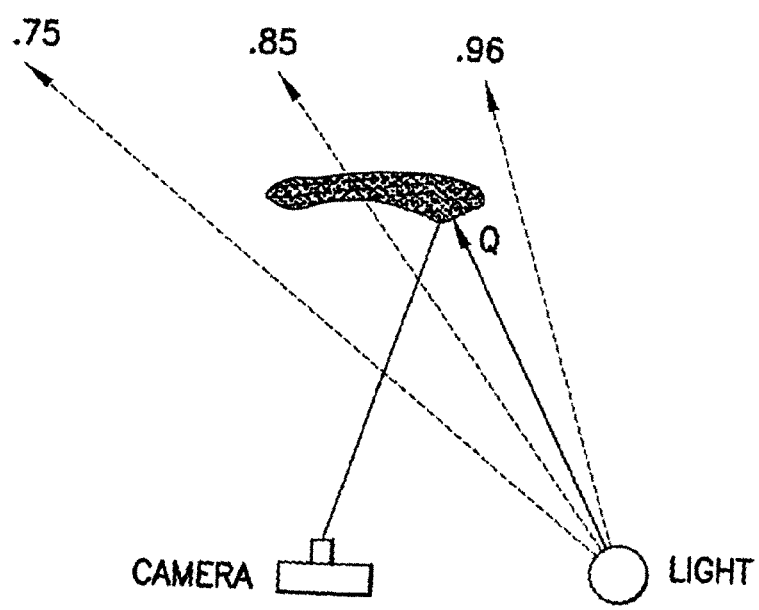

More specifically, FIG. 9 shows that sampling points across the target surface 300 is equivalent to sampling directions from the source. In FIG. 9A a ratio of real (Im) to ideal light (Ic) intensity for each sample direction can be computed as a light correction factor. In this example values of 0.96, 0.85 and 0.75 are found. The light intensity for other directions can be found then by interpolation, for either the case of scanning on a plane similar to the target 300 (FIG. 9A) or a true 3D object (FIG. 9B). In FIG. 9A, the incident light is computed at point S as the light from the ideal source divided by the correction factor that is interpolated between the values of 0.75 and 0.85. In FIG. 9B the incident light at point Q is computed as the light from the ideal source divided by the correction factor that is interpolated between 0.85 and 0.96.

In the preferred embodiment of this invention the positions of the light sources 210, 220, 230, 240 and 250 are obtained by taking an image of the calibration surface 300, which has been coated with a diffusely reflecting material (e.g., white paint), with each of the lights sources 210–250 turned on in turn. The polygonal shape 400 with sharp corners has been inscribed on the surface 300, and the set of cones 500 have been mounted on the surface 300. When one of the array 200 of lights 210–250 is illuminated, the set of shadows 600 are cast by the cones 500. The use of the system shown in FIG. 4 is illustrated in FIG. 10. It is assumed that a data processor 180 is coupled to the camera 100 and receives captured images therefrom. The data processor 180 is programmed to implement the following method.

In the first step 700 the camera 100 is calibrated using any suitable method, such as the method described by Tsai. In step 710 the calibration target 20 having surface 300 is placed in view of the camera 100. For each of the light sources 210–250 to be calibrated, an image is captured in step 720, and then processed in step 730. In the final step the calibrated light source data is stored 800. The target 20 can then be removed, and an object to be imaged placed in front of the camera 100.

Figure 7A:
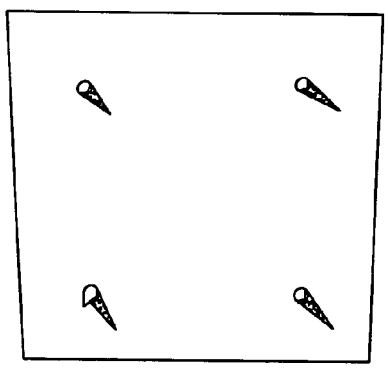
FIGS. 7A–7D, collectively referred to as FIG. 7, illustrates the detection of the target corner points and shadow tips for a set of images.
Figure 7B:
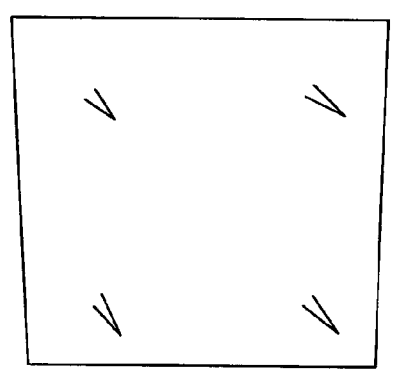
Figure 7C:
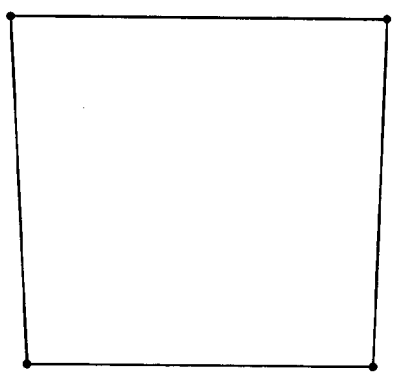
Figure 7D:
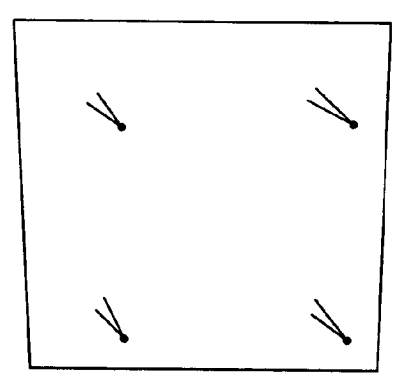

FIG. 11 shows the details of the image processing performed by the data processor 180 in step 730 of FIG. 10. In step 733 the corners of the polygonal shape 400 are detected. This may be done by applying edge detection and line fitting as illustrated in FIGS. 7B and 7C. In step 736 the location of the surface 300 in terms of the coordinate system of the calibrated camera 100 is calculated using the image locations detected, and the known distances between the 3D points on the surface 300. In step 739 the tips of the shadows 600 are detected as illustrated FIG. 7D. In step 742 the light source positions are computed from the known locations of the tips of the cones 500 and cone shadows 600. This calculation preferably finds a least squares solution for the intersection of all of the lines formed by the shadow 600 tips and corresponding cone 500 tips in the image. If the relative positions of the light sources 210–250 is fixed, the calculation can be made more accurately by solving for all of the light source positions simultaneously. In step 745 the intensities of the pixels in the image acquired in step 720 are sampled at some preset number of points on the target (as shown in FIG. 8), and are compared to the intensities that would be observed in the presence of an ideal isotropic light source. In step 748 a directional distribution for each light source 210–250 is computed as an interpolation function between the corrected light values found at the sample points. When multiple sources are being processed, steps 733 and 736 only need to be performed for the first source. The location of the target surface 300 is then known and can be used in the calculations for the subsequent sources.

FIG. 5 shows an alternative embodiment, in which the separate shape capture device 900 is used with the calibrated camera 100 and light source array 200. The shape captured with device 900 is calibrated in the same coordinate system as camera 100, so that surface detail from images captured by camera 100 using the light source array 200 can be computed for shapes captured with device 900.

In one suitable embodiment the system 10 includes a ShapeGrabber™ laser range scanner 900, a Fuji FinePix™ S1 Pro digital color camera 100, and five halogen (150 W) light sources 210–250 mounted on a 100 cm by 50 cm aluminum rack, as shown in FIG. 1. The system may be used with a scanning table that contains an embedded Kaidan turntable. The use of a scanning table with embedded turntable enables scanning with little manual repositioning of the scanner 900 relative to the object. The camera 100 preferably has an adjustable lens so that the user can adjust the zoom to accommodate scanning objects of various sizes. The camera 100 can also be moved and tilted with respect to the range scanner 900 to adjust for different types of objects. The halogen bulbs are enclosed in a housing that includes a diffuser in front of the bulb to ensure smooth directional distribution of emitted light. All of the system elements are under control from a scanning workstation that embodies the data processor 180, such as an IBM Intellistation™ MPro™ with a Pentium™ IV microprocessor and NVIDIA Quadro2™ graphics. The turntable, a light source relay box and a laser scanner 900 panning stage are all controlled through serial connections. The color camera 100 is connected to the data processor 180 via a USB port. Communication to the scanning head is by IEEE 1394 (fire wire.)

Various suitable and exemplary dimensions for the embodiments depicted in the Figures are as follows: the target surface 300 may be 60 cm by 40 cm; the polygon 400 may be a square 25 cm on a side, and the center-to-center spacing between the cones 500 may be 15 cm. Each cone 500 may have a circular base of diameter 1 cm and a height of 4 cm. In FIGS. 4 and 5 the distance D may be 60 cm. In FIG. 12 the cube 1000 may be 20 cm on a side, and each checkerboard square may be 2 cm on a side.

One implementation of the light source calibration procedure is in a scanner used for cultural heritage applications, such as one for scanning and recording the shapes of archeological artifacts. In addition, the teachings of this invention can be used in a number of different types of applications, including as examples only, medical applications to image various objects, fingerprint applications, as well as for industrial 3D inspection applications (e.g., for crack and flaw detection) and for the imaging of objects for advertising purposes, such as for web-enabled electronic commerce applications. The teachings of this invention are also not limited to the use of visual light sources and detectors (cameras), but may be used with other frequencies of light, including infrared and ultraviolet light, with suitable detector(s).

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims.

As but some examples, the use of a single light source that is translated from position to position can be used in lieu of a plurality of light sources at fixed positions. As another example, other 3D object shapes than cones having circular cylindrical base can be used for the calibration objects 500, such as objects having a polyhedral, e.g., a rectangular or a square or a hexagonal, base shape and that terminate in a point or some other feature that casts a shadow that can be readily and accurately located in the captured image. Also, other than a white coating material can be used, so long as sufficient distinction in the captured images can be made between the background (surface 300) and the reference points, e.g., the corners of the polygon 400, as well as the tips of the cones 600 and the cast shadows 700.

However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A light source calibration target, comprising:
   a substrate having a substantially Lambertian surface;
   a plurality of reference marks formed on said surface that are visually distinct from said surface and comprising at least one visually distinct shape having corners formed on said surface so as to be visually distinct from said surface; and
   a plurality of three dimensional objects mounted on said surface each having an upstanding feature disposed above said surface;
   said light source calibration target for being disposed in a field of view of an image capture system that includes a camera to calibrate individual ones of a plurality of light sources by operating the camera to capture an image of the light source calibration target with an individual one of the light sources turned on, by constructing a plurality of lines each of which intersects the feature of an object and a point on a shadow cast by the feature, and by determining a location of the light source as a point of intersection of the plurality of lines, and further comprising determining a correction factor corresponding to a difference between a light source emission distribution and an ideal light source emission distribution.

2. A light source calibration target as in claim 1, where said reference marks comprise corners of a polygonal pattern.

3. A light source calibration target as in claim 1, where said plurality of three dimensional objects comprise cone shaped objects having a base mounted to said surface and upstanding tips.

4. A light source calibration target as in claim 1, where said reference marks comprise corners of a polygonal pattern, and where said plurality of three dimensional objects comprise at least two cone shaped objects having a base mounted to said surface within said polygonal pattern.

5. A method to calibrate a plurality of light sources of an image capture system that includes a calibrated camera, comprising:
   placing a calibration target having a surface in view of the camera, the target comprising a substrate having a substantially Lambertian surface, a visually distinct polygonal shape having corners formed on said surface so as to be visually distinct from said surface, and a plurality of objects each having an upstanding tip mounted on said surface;
   for each of the light sources to be calibrated, capturing an image of the target;
   processing the captured image to derive light source calibration data; and
   storing the calibration data, where processing the captured image comprises:
   detecting the locations of the corners of the polygonal shape in the captured image;
   determining the location of the surface in terms of a coordinate system of the calibrated camera using the corner locations and known distances between three dimensional points on the surface;
   for each of the light sources to be calibrated, detecting the locations of the tips of shadows cast by the plurality of objects;
   determining the light source position from the known locations of the tips of the plurality of objects and from the detected locations of the tips of the shadows by an intersection of lines formed by the shadow tips and corresponding object tips in the captured image;
   sampling intensities of image pixels at sample points and comparing the sampled intensities to intensities that would be observed in if the light source were an ideal isotropic light source to determine corrected values; and
   computing a directional distribution for the light source using the corrected values.

6. A method as in claim 5, where computing a directional distribution comprises interpolating.

7. An image capture system comprising a plurality of light sources, a calibrated digital camera and a data processor coupled to the camera, further comprising:
   a calibration target having a surface in view of the camera, the target comprising a substrate having a substantially Lambertian surface, a visually distinct polygonal shape having corners formed on said surface so as to be visually distinct from said surface, and a plurality of objects each having an upstanding tip mounted on said surface; and
   said data processor operating with said camera under control of a stored program, for each of the light sources to be calibrated, for capturing an image of the target and processing the captured image to derive light source calibration data and for storing the calibration data,
   where said data processor, when processing the captured image, operates under control of said stored program for detecting the locations of the corners of the polygonal shape in the captured image; determining the location of the surface in terms of a coordinate system of the calibrated camera using the corner locations and known distances between three dimensional points on the surface; for each of the light sources to be calibrated, detecting the locations of the tips of shadows cast by the plurality of objects; determining the light source position from the known locations of the tips of the plurality of objects and from the detected locations of the tips of the shadows by an intersection of lines formed by the shadow tips and corresponding object tips in the captured image; sampling intensities of image pixels at sample points and comparing the sampled intensities to intensities that would be observed in if the light source were an ideal isotropic light source to determine corrected values; and computing a directional distribution for the light source using the corrected values.

8. A system as in claim 7, where computing a directional distribution comprises interpolating.

9. A method to calibrate individual ones of a plurality of light sources of an image capture system that includes a camera, comprising:

placing a calibration target having a surface in view of the camera, the target comprising a substrate having a diffusely reflecting surface, a visually distinct shape having corners formed on said surface so as to be visually distinct from said surface, and a plurality of objects mounted on said surface each having an upstanding feature disposed above said surface;

for each of the light sources to be calibrated, capturing an image of the target with the light source turned on and constructing a plurality of lines each of which intersects the feature of an object and a point on a shadow cast by the feature; and determining a location of the light source as a point of intersection of the plurality of lines, further comprising determining a correction factor corresponding to a difference between a light source emission distribution and an ideal light source emission distribution.

10. A method as in claim 9, further comprising initially processing a captured image to determine an orientation of the surface relative to the camera based on an image of the corners.

11. A method as in claim 9, further comprising initially calibrating the camera.

12. A computer program product embodied on or in a computer readable media, comprising program instructions encoded for causing a computer to perform a method to calibrate individual ones of a plurality of light sources of an image capture system that includes a camera, where a calibration target having a surface is placed in view of the camera, the target comprising a substrate having a diffusely reflecting surface, a visually distinct shape having corners formed on said surface so as to be visually distinct from said surface, and a plurality of objects mounted on said surface each having an upstanding feature disposed above said surface, the method operating, for each of the light sources to be calibrated, to capture an image of the target with the light source turned on, to construct a plurality of lines each of which intersects the feature of an object and a point on a shadow cast by the feature, and to determine a location of the light source as a point of intersection of the plurality of lines, where the method further comprises determining a correction factor corresponding to a difference between a light source emission distribution and an ideal light source emission distribution.

13. A computer program product as in claim 12, where the method further comprises initially calibrating the camera.

14. A computer program product embodied on or in a computer readable media, comprising program instructions encoded for causing a computer to perform a method to calibrate individual ones of a plurality of light sources of an image capture system that includes a camera, where a calibration target having a surface is placed in view of the camera, the target comprising a substrate having a diffusely reflecting surface, a visually distinct shape having corners formed on said surface so as to be visually distinct from said surface, and a plurality of objects mounted on said surface each having an upstanding feature disposed above said surface, the method operating, for each of the light sources to be calibrated, to capture an image of the target with the light source turned on, to construct a plurality of lines each of which intersects the feature of an object and a point on a shadow cast by the feature, and to determine a location of the light source as a point of intersection of the plurality of lines, where the method further comprises initially processing a captured image to determine an orientation of the surface relative to the camera based on an image of the corners.

* * * * *